(12) United States Patent
den Adel et al.

(10) Patent No.: US 11,350,644 B2
(45) Date of Patent: Jun. 7, 2022

(54) PROCESS FOR THE PREPARATION OF EDIBLE FAT-CONTINUOUS EMULSIONS

(71) Applicant: Upfield US Inc., Englewood Cliffs, NJ (US)

(72) Inventors: Rudi den Adel, Barendrecht (NL); Georg Christian Dol, Spijkenisse (NL); Ronald Peter Potman, Papendrecht (NL); Irene Erica Smit-Kingma, Voorburg (NL)

(73) Assignee: UPFIELD EUROPE B.V., Rotterdam (NL)

( * ) Notice: Subject to any disclaimer, the term of this patent is extended or adjusted under 35 U.S.C. 154(b) by 770 days.

(21) Appl. No.: 14/400,173

(22) PCT Filed: Apr. 22, 2013

(86) PCT No.: PCT/EP2013/058248
§ 371 (c)(1),
(2) Date: Nov. 10, 2014

(87) PCT Pub. No.: WO2013/171027
PCT Pub. Date: Nov. 21, 2013

(65) Prior Publication Data
US 2015/0140197 A1    May 21, 2015

(30) Foreign Application Priority Data
May 16, 2012    (EP) ..................................... 12168344

(51) Int. Cl.
A23D 7/00    (2006.01)
A23D 9/05    (2006.01)

(52) U.S. Cl.
CPC ............... *A23D 7/001* (2013.01); *A23D 9/05* (2013.01)

(58) Field of Classification Search
CPC .................................. A23D 7/001; A23D 9/05
See application file for complete search history.

(56) References Cited

U.S. PATENT DOCUMENTS

| 4,888,197 A | * 12/1989 | Wieske ................... A23D 7/015 426/602 |
| 5,139,803 A | 8/1992 | Haynes et al. |
| 9,924,730 B2 | 3/2018 | Flöter et al. |
| 2011/0256300 A1 | 10/2011 | Dobenesque et al. |

FOREIGN PATENT DOCUMENTS

| EP | 1651338 | 5/2006 |
| NL | WO 2010069753 A1 * | 6/2010 ............. A23D 7/001 |
| WO | WO0141586 | 6/2001 |
| WO | WO2005014158 | 2/2005 |
| WO | WO2005074722 | 8/2005 |
| WO | WO2005000020 A3 | 5/2007 |
| WO | WO2010000020 A1 | 1/2010 |
| WO | WO2010069752 | 6/2010 |
| WO | WO2011000020 | 1/2011 |
| WO | WO2011160921 | 12/2011 |

OTHER PUBLICATIONS

Elvers et al, Margarines and shortenings, Ullmanns Encyclopedia of Industrial Chemistry, 1990, 156-158, 5th Edition, vol. A16.
IPRP in PCTEP2013058248, dated Mar. 26, 2014.
P. Munuklu et al, Erratum—Particle formation of edible fats using the supercritical melt micronization process (ScMM), Journal of Supercritical Fluids, 2007, 181-190See Also Journal of Supercritical Fluids 2007 vol. 40 P433, 43.
Search Report in EP12168344, dated Oct. 2, 2012.
Search Report in PCTEP2013058248, dated Jul. 10, 2013.
Van Den Enden, A method for the determination of the solid phase content of fats using pulse nuclear magnetic resonance, Fette Seifen Anstrichmittel, 1978, pp. 180-186, vol. 80.
Written Opinion EP12168344, dated Oct. 2, 2012.
Written Opinion in PCTEP2013058248, dated Jul. 10, 2013.

* cited by examiner

*Primary Examiner* — Lien T Tran
*Assistant Examiner* — Tynesha L McClain
(74) *Attorney, Agent, or Firm* — Arentfox Schiff LLP

(57) ABSTRACT

Process for manufacturing edible fat continuous emulsions comprising 10 to 85 wt. % of a dispersed water-phase and 15 to 90 wt. % of total fat, said process comprising the steps of: a. providing a water-phase; b. providing liquid oil; c. providing fat powder comprising hardstock fat; d. providing hardstock fat in liquid form; e. mixing fat powder comprising hardstock fat, hardstock fat in liquid form and liquid oil to provide an oil-slurry; f. mixing the oil-slurry provided at step 'e' with the water-phase to provide a water-in-oil emulsion, wherein the fat powder is not subjected to temperatures at which a substantial part of the fat powder melts. An edible fat continuous emulsion comprising 10 to 85 wt. % of a dispersed water-phase and 15 to 90 wt. % of total fat, comprising at least 2 wt. %, based on the weight of total fat, of a first hardstock fat with the following solid fat profile: N20 from 65 to 95; N35 from 25 to 55; and further comprising at least 2 wt. %, based on the weight of total fat, of a second hardstock fat with the following solid fat profile: N20 from 5 to 95; N30 below 60, wherein the Quotient-A is from 0.95 to 0.2, and wherein the emulsion has a glossiness-value of at least 4 and a Stevens-value of at least 75, wherein Quotient-A is the FWHM value of an emulsion divided by the FWHM value of the emulsion after rework using a votator process.

18 Claims, No Drawings

PROCESS FOR THE PREPARATION OF EDIBLE FAT-CONTINUOUS EMULSIONS

FIELD OF INVENTION

The present invention relates to a process for the preparation of an edible fat continuous emulsion comprising the use of fat powder comprising hardstock fat and hardstock fat in liquid form. Furthermore, the invention relates to emulsions comprising 10 to 85 wt. % of a dispersed water-phase and 15 to 90 wt. % of total fat.

BACKGROUND OF INVENTION

Edible fat-continuous emulsions like e.g. margarine and low fat spreads are well known food products that comprise a continuous fat-phase and a dispersed water-phase (a.k.a. water-in-oil emulsions or W/O emulsions).

Margarine is generally defined as a composition containing at least 80 wt. % of fat and about 20 wt. % of a water-phase. In contrast, emulsions containing less than 80 wt. % fat are generally called spreads. Nowadays the terms margarine and spread are often used interchangeably although in some countries the commercial use of the term margarine is subject to certain regulatory requirements. The main difference between margarine and spread is the amount of fat. For the purpose of the present invention the terms margarine and spread are used interchangeably.

The fat-phase of margarine and similar edible fat-continuous emulsions comprises a mixture of liquid oil (i.e. fat that is liquid at ambient temperature) and fat which is solid at ambient temperature. The liquid oil fraction typically comprises liquid unmodified vegetable oil such as soybean oil, sunflower oil, linseed oil, low erucic rapeseed oil (Canola), corn oil (maize oil) and blends of vegetable oils. The solid fat, also called structuring fat or hardstock fat, serves to structure the fat-phase by forming a fat crystal network throughout the continuous oil-phase. It also helps to stabilize the emulsion. The droplets of the water-phase are fixed within the spaces of the lattice of solid fat crystals. This prevents coalescence of the droplets and separation of the heavier water-phase from the fat-phase.

Processes have been disclosed to manufacture emulsions wherein the structuring fat is added as fat powder (i.e. pre-crystallized fat). An example of such a process can be found in WO2010/069752.

Generally, edible emulsions made using fat powder (i.e. pre-crystallized fat) are prepared according to the following steps:
  a. mixing of fat powder and liquid oil to provide a slurry;
  b. providing a water-phase;
  c. mixing the slurry and the water-phase to form a fat-continuous emulsion,
wherein the fat-powder is typically not subjected to a temperature at which the fat powder will substantially melt.

A commonly used type of fat powder is micronized fat powder, which is for example obtainable by a Super Critical Melt Micronisation process, as described in J. of Supercritical Fluids 43 (2007) 181-190 and EP1651338.

WO2011/160921 relates to edible fat powders and the use of such edible fat powders to prepare fat continuous emulsions.

On a factory scale typically a range of different W/O emulsion products may be manufactured. A drawback of the fat powder process is that manufacture of the fat powder itself is time consuming and requires additional machines which can take up a large part of the available factory space such as a hopper. Indeed the machines to produce the fat powder are in addition to the machines that convert the fat powder, oil, water-phase and any other ingredients into a finished emulsion. Therefore, on factory scale having multiple W/O emulsion production lines, preferably a limited the number of fat powder types, and more preferably one type of fat powder, is used for the manufacture of different W/O emulsion products.

The fat powder therefore serves the general requirements of the different emulsion-types. For example different W/O emulsion products include products directed to spreading, to be low-fat and/or low in saturated fatty acid esters (SAFA), directed to (shallow) frying, be suitable for baking, and so on. The W/O emulsion products may also differ in their principal physical form. In the market place margarine is generally sold as one of three principal forms, namely hard or stick margarine (generally referred to as wrapper margarine), soft or tub margarine and liquid or pourable margarine. It follows from the different intended uses and intended physical forms that different W/O emulsion products will have different optimal values/levels of for example, hardness, pourability, stability, overall organoleptic and visual appearance, such as glossiness. For example, one the one hand it may be desirable to improve the hardness of a wrapper margarine, for improved packaging, but on the other it may be desirable to reduce the hardness of a liquid margarine for improved pourability. For example, it may be desirable for a low-fat spread to have a higher glossiness. Therefore, to improve the quality of each of the products, different characteristics need improving and/or the characteristics require modification but in opposite direction. This is especially difficult when these products are made on factory scale with just a few or even a single type of fat powder. For example, changing the fat powder composition to optimize the characteristics of one W/O emulsion product may change one or more characteristics of one or more other products made with the powder. Such a change may be undesirable. Thus the fat powder process on factory scale is typically inflexible.

Another general process for the manufacture of emulsions which is the so-called votator or churn process, which encompasses the following steps:
1. Mixing of the liquid oil, the structuring fat and if present the water-phase at a temperature at which the structuring fat is definitely liquid;
2. cooling of the mixture under high shear to induce crystallization of the structuring fat to create an emulsion;
3. formation of a fat crystal network to stabilize the resulting emulsion and give the product some degree of firmness;
4. modification of the crystal network to produce the desired firmness, confer plasticity and reduce the water droplet size.

These steps are usually conducted in a process that involves apparatus that allow heating, cooling and mechanical working of the ingredients, such as the churn process or the votator process. The churn process and the votator process are described in the Ullmans Encyclopedia, Fifth Edition, Volume A 16, pages 156-158.

One of the benefits of the use of fat powder for emulsions, in comparison with the votator or churn process (see below) is a reduction in energy requirement, a broader range of fat suitable as hardstock fat and that it allows a reduction in SAFA.

Besides the desirability to have a manufacturing process capable of independently optimizing the characteristics of the different emulsion products made with the process, it is also desirable to be able to independently change the different characteristics in each single emulsion product. For example, if one of the attributes is already optimal, such as glossiness in a spread, but another one is not, such as hardness, it is desirable to be able to change the hardness of a spread without a concomitant change in the glossiness of the spread. It was observed that changing the hardstock composition in a votator process or the fat powder composition in a fat powder process may lead to a change in more than one characteristic of a W/O emulsion, such as a change in both hardness and glossiness.

Thus, there is a need for a process to manufacture fat-continuous (i.e. W/O) emulsions which allow changing one attribute (i.e. characteristic) of an emulsion product without affecting the value of a second attribute.

In particular, there is a need for a process to manufacture a W/O emulsion, wherein said emulsion has a changed, preferably an increased, hardness with little or no change in glossiness. Preferably said process is capable of doing so using only a few, more preferably a single type of fat powder.

Furthermore, there is a need for a more flexible factory scale process capable of manufacturing different types of emulsions using a few, preferably a single type of fat powder, wherein the characteristics of one type of product can be changed without affecting the characteristic of other products made with the process. Preferably said process is capable of doing so using only a few, more preferably a single type of fat powder.

Furthermore, there is a need for a W/O emulsion, preferably a spread, which has both a good hardness and a good glossiness.

SUMMARY OF THE INVENTION

It was found that one or more of the above objectives is achieved by a process for the manufacture of water-in-oil emulsions (W/O emulsions) wherein a combination of hardstock fat in liquid form and fat powder comprising hardstock fat is used.

Therefore, in a first aspect the invention relates to a process for manufacturing edible fat continuous emulsions comprising 10 to 85 wt. % of a dispersed water-phase and 15 to 90 wt. % of total fat, said process comprising the steps of:
a. providing a water-phase;
b. providing liquid oil;
c. providing fat powder comprising hardstock fat;
d. providing hardstock fat in liquid form;
e. mixing fat powder comprising hardstock fat, hardstock fat in liquid form and liquid oil to provide an oil-slurry;
f. mixing the oil-slurry provided at step 'e' with the water-phase to provide a water-in-oil emulsion,
wherein the fat powder is not subjected to temperatures at which a substantial part of the fat powder melts.

Surprisingly it was found that the process according to the invention allows the modification of a characteristic of a W/O emulsion with little or no change in a second characteristic of the emulsion. In particular, it was surprisingly found that for emulsions made with both hardstock fat in the form of fat powder and hardstock fat in the form of liquid hardstock, it was possible to modify the hardness while maintaining a constant and good glossiness. In contrast, for emulsions made in a votator process or in the fat powder process, as described in the background of the invention, it was observed that an increase in hardness lead to an increase of the glossiness.

Furthermore, the process of the invention can be implemented on a factory scale and enables the production of further improved W/O emulsion products. For example, the process enables modification of a characteristic of a product, such as hardness, independently from that characteristic in other products made with the process. For example, as mentioned above one characteristic of a product, such as hardness, can also be modified independently from another characteristic of the same product, such as glossiness. This improved flexibility of the process could be achieved while using a single and simple type of fat powder allowing easy implementation at factory scale.

With the process of the invention new W/O emulsions can be made, which have both a constant and good glossiness and a good firmness (i.e. hardness).

Therefore, in a second aspect, the invention relates to an edible fat continuous emulsion comprising 10 to 85 wt. % of a dispersed water-phase and 15 to 90 wt. % of total fat, obtainable by a process according to the invention, comprising at least 2 wt. %, based on the weight of total fat, of a first hardstock fat with the following solid fat profile:
N20 from 65 to 95;
N35 from 25 to 55;
and further comprising at least 2 wt. %, based on the weight of total fat, of a second hardstock fat with the following solid fat profile:
N20 from 5 to 95;
N30 below 60.

Therefore, in a third aspect, the invention also relates to an edible fat continuous emulsion comprising 10 to 85 wt. % of a dispersed water-phase and 15 to 90 wt. % of total fat, comprising at least 2 wt. %, based on the weight of total fat, of a first hardstock fat with the following solid fat profile:
N20 from 65 to 95;
N35 from 25 to 55;
and further comprising at least 2 wt. %, based on the weight of total fat, of a second hardstock fat with the following solid fat profile:
N20 from 5 to 95;
N30 below 60,
wherein the Quotient-A is from 0.95 to 0.2, and
wherein the emulsion has a glossiness-value of at least 4 and a Stevens-value of at least 75,
wherein Quotient-A is the FWHM value of an emulsion divided by the FWHM value of the emulsion after rework using a votator process.

Without wishing to be bound by theory, it is believed that adding hardstock in said two distinct forms results in a fat crystal network comprising two types of fat-crystals. One type of fat-crystal being derived from the fat powder and thought to have a predominantly homogenously mixed triacylglyceride layering. The second type of fat-crystal being derived from the hardstock in liquid form and thought to have a predominantly non-homogenous triacylglyceride layering. It is believed that these two types of fat-crystals allow independent manipulation of different characteristics of an emulsion.

Line broadening of the first order long spacing (expressed as Full Width at Half Maximum (FWHM)) of fat crystallites (building blocks of fat crystals) as measured by SAXS (Small-Angle X-ray scattering) can be used to monitor the crystallite thickness and the level of mixed triacyltryglic-eride layering. In particular, line broadening is dependent on the amount of repeating bilayers of triglycerides which determines the thickness of a crystallite, the level of order/disorder of the triglycerides arrangement in the repeating bilayers and the triglyceride composition of the hardstock. Therefore, parameters derived from the SAXS measurements can be used to indicate the nature of the fat-crystals in an emulsion and can be used to characterize an emulsion according to the invention (e.g. Quotient-A).

DETAILED DESCRIPTION OF THE INVENTION

Weight percentage (wt. %) is based on the total weight of the composition unless otherwise stated. The terms 'fat' and 'oil' are used interchangeably. The terms 'firmness' and 'hardness' are used interchangeably. The terms 'water-in-oil emulsion', 'W/O emulsion' and 'fat-continuous emulsion' are used interchangeably. Hardstock fat is an oil or fat which has at least 5% solids at a temperature of 20 degrees Celsius. Liquid oil is an oil or fat which has less than 5% solids at a temperature of 20 degrees Celsius The process according to the current invention comprises providing a water-phase, liquid oil, fat powder comprising hardstock fat and hardstock fat in liquid form.

Hardstock Fat in Liquid Form

The process according to the invention comprises the step of providing hardstock in liquid form. This is to be understood as providing hardstock which is at least substantially liquid, preferably completely liquid, before coming into contact, preferably at the moment of contact, with at least part, preferably all, of the fat powder.

Hardstock can be liquid for example by having an elevated temperature (i.e. well-above ambient temperature, such as 60 degrees Celsius), by existing in a supersaturated state and/or by the activity of a solvent, such as an organic solvent.

Preferably, hardstock in liquid form is provided at step 'd' by mixing hardstock with part, or even all, of the liquid oil at an elevated temperature.

It will be appreciated that the hardstock in liquid form, alone or in combination with liquid oil, is sufficiently cool, before coming into contact with fat powder to prevent a substantial part of the fat powder from melting. For example, if necessary, the hardstock in liquid form is cooled by a heat exchanger and/or by mixing with any remaining part of the liquid oil, wherein said remaining part of the liquid oil has a sufficiently low temperature.

For example, hardstock in liquid form may be provided by mixing hardstock with 1% of the oil and heating this mixture to 75 degrees Celsius. This solution, for example, can then be cooled by mixing with the remaining part of the oil having a temperature of about 14 degrees Celsius. For example, next this mixture comprising oil and liquid hardstock can be mixed with the fat powder to provide the oil-slurry at step 'e'.

Preferably, hardstock fat in liquid form is provided by mixing hardstock fat with at least part of the liquid oil at elevated temperatures, wherein said temperature is at least 50 degrees Celsius, preferably at least 60 degrees Celsius and more preferably at least 70 degrees Celsius.

Fat Powder

The fat powder comprises hardstock fat and preferably comprises at least 80 wt. % of hardstock fat, more preferably at least 85 wt. %, even more preferably at least 90 wt. %, even more preferably at least 95 wt. % and even more preferably at least 98 wt. %. Still even more preferably the edible fat powder essentially consists of hardstock fat.

The hardstock fat as present in the edible fat powder has a solid fat content N10 from 50 to 100, N20 from 26 to 95 and N35 from 2 to 60.

Suitable methods to prepare the fat powder include for example Super Critical Melt Micronisation (ScMM), also known as particles from gas saturated solutions (PGSS). This is a commonly known method and is for example described in J. of Supercritical Fluids 43 (2007) 181-190, EP1651338 and WO2005/014158.

The process according to the invention is especially beneficial when used with fat powder that has been prepared using a ScMM process. Preferably the fat powder used in the process according to the invention is micronized fat powder and more preferably is micronized fat powder obtainable by supercritical melt micronisation.

For implementation of the process on factory scale, it is preferred that in the process according to the invention at most three, more preferably at most two and even more preferably only one type of fat powder is used. Furthermore, to facilitate implementation of the process on factory scale, the hardstock comprised by the fat powder is simple and preferably is made of at most three, more preferably at most two and even more preferably a single source of hardstock.

Composition and Amount of Hardstock

The composition of the hardstock fat comprised by the fat powder and the composition of the hardstock fat in liquid form may differ. The hardstock fat, as comprised by the fat powder and as added in liquid form, may each be a single fat or a mixture of different fats. Said hardstock fats may be of vegetable, animal or marine origin. The hardstock of emulsions according to the invention generally may comprise conventional oils and fats which may be of both animal and vegetable origin. Examples of sources of conventional oils and fats include, optionally fractions of, coconut oil, palm kernel oil, palm oil, marine oils, lard, tallow fat, butter fat, soybean oil, safflower oil, cotton seed oil, rapeseed oil, poppy seed oil, corn oil, sunflower oil, olive oil, algae oil and blends thereof. For the purpose of this invention, algae oils are considered vegetable oils.

Preferably the hardstock in liquid form is selected from the list, including fractions and interesterified mixtures thereof, consisting of butter fat, cacao butter, shea oil, palm oil, palm kernel oil, coconut oil and blends thereof.

Hydrogenation may be used to alter the degree of unsaturation of the fatty acids and as such to alter the fatty acid composition. A drawback of hydrogenation, especially of partial hydrogenation, is the formation of by products like e.g. trans fatty acids. Furthermore some consumers perceive hydrogenated fats as unnatural and therefore undesirable. Preferably the emulsion of the invention comprises hardstock which does not contain fully hydrogenated fats or partially hydrogenated fats. Preferably the emulsion of the invention comprises only natural fats. Preferably at least 50 wt. % of the hardstock fat (based on total amount of hardstock fat) is of vegetable origin, more preferably at least 60 wt. %, even more preferably at least 70 wt. %, even more preferably at least 80 wt. %, even more preferably at least 90 wt % and even more preferably at least 95 wt. %. Still even more preferably the hardstock fat essentially consists of hardstock fat of vegetable origin.

The composition of the hardstock fat comprised by the fat powder and the composition of the hardstock fat in liquid form may influence the characteristics of the W/O emulsion products, such as stability, glossiness and hardness.

In particular, it was found that when in the process according to the invention the hardstock fat comprised by the fat powder has the following solid fat profile:
N20 from 65 to 95;
N35 from 25 to 55;
preferably has the following solid fat profile:
N20 from 70 to 90;
N35 from 30 to 50;

more preferably has the following solid fat profile:
N20 from 75 to 85;
N35 from 35 to 45;
and even more preferably, the hardstock fat comprised by the fat powder is an interesterified mixture of 65% dry fractionated palm oil stearin with an Iodine Value of 14 and 35% palm kernel oil; it results in emulsions having an excellent glossy appearance of a good firmness.

In particular, it was found that when in the process according to the invention the hardstock fat in liquid form has the following solid fat profile:
N20 from 5 to 90;
N30 below 60;
preferably has the following solid fat profile:
N20 from 10 to 80;
N30 below 30;
more preferably has the following solid fat profile:
N20 from 15 to 70;
N30 below 20;
even more preferably has the following solid fat profile:
N20 from 25 to 65;
N30 below 10;
and still even more preferably is palm kernel fat (i.e. fully hydrogenated palm kernel oil), coconut oil or a combination thereof; it results in emulsions having an excellent glossy appearance of a good firmness.

Addition of a greater amount of liquid hardstock, in the process according to the invention, typically results in emulsions with an increased hardness (i.e. firmness), as measured in Stevens value. Varying the amount of fat powder comprising hardstock fat, in the process according to the invention, typically enables modification of another characteristic of the resulting emulsion, such as glossiness. As mentioned above, the process according to the invention enables the modification of different characteristics of an emulsion, such as hardness and glossiness, independently from each other.

Preferably the fat powder comprising hardstock fat and hardstock fat in liquid form are each added in an amount of from 0.5 to 25 wt. % (e.g. 20 wt. % of the hardstock comprised by the fat powder and 20 wt. % of the hardstock in liquid form), more preferably from 4 to 20 wt. % and even more preferably from 6 to 15 wt. % and still even more preferably from 8 to 14 wt. %, based on the weight of total fat.

Water-Phase

The water-phase is prepared according to the standard way in accordance with the chosen ingredients. The water-phase of the emulsion may suitably contain a variety of food grade ingredients, such as sodium chloride, acidulent, preservative, water-soluble flavoring, polysaccharides, minerals and water-soluble vitamins. The water-phase may also comprise liquid oil, for example to aid the inclusion of hydrophobic ingredients in the water-phase. The water-phase may also comprise proteins and non-gelling proteins, like for example dairy proteins. The water-phase may also comprise gelling and/or thickening agents like for example starches, vegetable gums, pectin and proteins suitable for such use like gelatine.

Liquid Oil

The liquid oil used in the process according to the invention may be a single oil or a mixture of different oils, and may comprise other components. Preferably at least 50 wt. % of the oil (based on total amount of oil) is of vegetable origin, more preferably at least 60 wt. %, even more preferably at least 70 wt. %, even more preferably at least 80 wt. %, even more preferably at least 90 wt. % and even more preferably at least 95 wt. %. Still even more preferably the oil essentially consists of oil of vegetable origin. The liquid oil fraction preferably comprises unmodified vegetable oil such as soybean oil, sunflower oil, linseed oil, low erucic rapeseed oil (Canola), corn oil (maize oil), olive oil, algae oil and blends of vegetable oils. For the purpose of this invention algae are considered vegetables.

Fat soluble emulsifiers are commonly used in the preparation of water-in-oil emulsions, such as spreads, to improve stabilization. Likewise, water soluble emulsifiers are used in the preparation of oil-in-water emulsion, like for example dressings, as these emulsifiers stabilize oil-in-water emulsions. The Hydrophilic-Lipophilic Balance (HLB) of an emulsifier is a measure of the degree to which it is hydrophilic or lipophilic. An emulsifier having an HLB value of 8 or lower is usually classified as being a water-in-oil promoting emulsifier and as fat soluble. Emulsifiers with an HLB of more than 8 are oil-in-water promoting. Preferably the liquid oil comprises a fat soluble emulsifier with an HLB of 8 or lower, more preferably a fat soluble emulsifier selected from the list consisting of monoglycerides, diglycerides, organic acid esters of monoglycerides, native lecithin, polyglycerol esters of fatty acids, sucrose esters of fatty acids and combinations thereof, even more preferably a fat soluble emulsifier essentially consisting of Dimodan RT, Dimodan HP or combinations thereof and still even more preferably a fat soluble emulsifier essentially consisting of Dimodan HP.

Mixing

The fat powder comprising hardstock fat, the hardstock fat in liquid form and the oil phase are mixed to provide an oil-slurry at step 'e'. All the fat powder, hardstock in liquid form and liquid oil can be mixed at step 'e' to provide an oil-slurry or parts thereof can be mixed, wherein the remaining parts are mixed at step 'f' together with the water-phase. Preferably all the hardstock in liquid form, the liquid oil and the fat powder comprising hardstock are mixed at step 'e'.

It was observed that mixing of a substantial part of the hardstock in liquid form directly into in the water-phase (i.e. not by first forming an oil-slurry) may lead to fouling of one or more of the machines used in emulsions making.

It is important that the fat powder is not subjected to temperatures at which the hardstock fat comprised by the fat powder melts as this severely reduces the ability of the fat powder to structure. This temperature depends on the hardstock fat comprised by the fat powder and can routinely be determined for example based on the solid fat content profile (i.e. N-lines) of the hardstock fat used. Preferably the fat powder, after production, has not been subjected to temperatures at which a substantial part of the fat powder melts and more preferably has not been subjected to above 25, more preferably above 15, even more preferably above 10 degrees Celsius. For example, care must be taken that hot ingredients, such as hot hardstock fat in liquid form, are not brought into contact with the fat powder in such a way as to melt a substantial part of the fat powder. Thus depending on the temperature of the fat powder and the other ingredients brought into contact with the powder cooling of the mixture can be applied.

Preferably the temperature of oil phase at step 'e' is from 5 to 25, more preferably 8 to 23 and even more preferably from 10 to 22 degrees Celsius. It is believed that at said preferred temperature ranges a more optimal and/or continuous fat-crystal network is created and melting of a substantial part of the fat powder is prevented.

The ingredients at step 'e' and step 'f' of the process according to the invention may be mixed using standard mixing, preferably low shear mixing, equipment common in the field of emulsions making for such use.

Preferably the temperature of the water-phase at step 'f' is from 10 to 25, more preferably 12 to 23 and even more preferably from 14 to 22 degrees Celsius. It is believed that at said preferred temperature ranges a more optimal and/or continuous fat-crystal network is created and melting of a substantial part of the fat powder is prevented.

Food Product

In another aspect the invention relates to edible fat-continuous emulsions, which are obtainable by a process according to the invention:

An edible fat continuous emulsion comprising 10 to 85 wt. % of a dispersed water-phase and 15 to 90 wt. % of total fat, obtainable by a process according to the invention, comprising at least 2 wt. %, based on the weight of total fat, of a first hardstock fat with the following solid fat profile:
N20 from 65 to 95;
N35 from 25 to 55;
and further comprising at least 2 wt. %, based on the weight of total fat, of a second hardstock fat with the following solid fat profile:
N20 from 5 to 95;
N30 below 60.

Emulsions obtainable according to a process of the invention have excellent glossiness and good firmness.

The edible fat-continuous emulsions made according to the process of the invention comprise 10 to 85 wt. %, preferably 15 to 70 wt. %, more preferably 20 to 60 wt. % and even more preferably 30 to 50 wt. % of a dispersed water phase, based on the total weight of the emulsion.

The edible fat-continuous emulsions made according to the process of the invention comprise 15 to 90 wt. % of total fat, based on the total weight of the emulsion. Nowadays W/O emulsions which are low in fat are desired by consumers as associated with health benefits. Preferably emulsions according to the invention comprise 20 to 80 wt. %, more preferably 25 to 65 wt. % and even more preferably 30 to 55 wt. % of total fat, based on the total weight of the emulsion. It will be appreciated that the combined weight % of the dispersed water phase and fat of the emulsion will not exceed 100 wt. %.

The W/O emulsions, according to the invention, made with fat powder comprising hardstock fat, have a structural feature which is different from emulsions not made with fat powder. An example of the latter are spreads made by the votator process. This structural feature can be observed using SAXS (Small-Angle X-ray Scattering) measurements.

Quotient-A

In particular, an emulsion according to the invention can be characterized by having quotient-A which is at most 0.95.

Quotient-A is determined by the following procedure.

First the FWHM-value of an emulsion is measured, and labeled FWHM-FP.

Next said emulsion is reworked according to the following votator process:

The W/O emulsion is mixed at a temperature at which the structuring fat is definitely liquid and thermostated at 60 degrees Celsius. This mixture was pumped at a throughput of 10 kg per hour through three successive A units (i.e. A1, A2 and A3) (set to 1000 rpm) and one C-unit (set to 2000 rpm). The temperatures for A1-A3 were respectively 15, 10 and 5 degrees Celsius, the C-unit was not cooled.

The FWHM value of the reworked W/O emulsion is also measured and labeled FWHM-V. The Quotient-A can be derived from the FWHM-FP and FWHM-V values as follows:

$$\text{Quotient-}A = \frac{FWHM\text{-}FP}{FWHM\text{-}V}$$

Thus Quotient-A is the FWHM value of an emulsion divided by the FWHM value of the emulsion after rework using a votator process (i.e. involving melting of the hardstock fat).

As mentioned above, the FWHM characteristic of a W/O emulsion provides information concerning the nature of the fat-crystals in the spread. What is observed is that the FWHM value of the fat-peak of a spread made according to the invention is different from a spread made with the votator process. Therefore, reworking a spread according to the invention with the votator process, results in a change in the Quotient-A. In particular, a spread according to the invention, made using fat powder, but reworked with the votator process will have an increase in absolute FWHM-value (i.e. a decrease in Quotient-A). It will be appreciated that a spread made by a votator process (i.e. not according to the invention), which is also reworked by the votator process, as described above, will have little or no change in FWHM value and will have a Quotient A close to 1.

Therefore, the present invention also relates to an edible fat continuous emulsion comprising 10 to 85 wt. % of a dispersed water-phase and 15 to 90 wt. % of total fat, comprising at least 2 wt. %, based on the weight of total fat, of a first hardstock fat with the following solid fat profile:
N20 from 65 to 95;
N35 from 25 to 55;
and further comprising at least 2 wt. %, based on the weight of total fat, of a second hardstock fat with the following solid fat profile:
N20 from 5 to 95;
N30 below 60,
wherein the Quotient-A is from 0.95 to 0.2, and
wherein the emulsion has a glossiness-value of at least 4 and a Stevens-value of at least 75.

It will be appreciated that the fat blend obtainable by mixing hardstock fat in liquid form, fat powder comprising hardstock fat and liquid oil, such as at step 'e', is capable of providing an emulsion, preferably a spread, having both a good hardness and a constant and good glossiness by mixing with a water-phase. Therefore the invention also relates to a fat blend comprising at least 2 wt. %, based on the weight of total fat, of a first hardstock fat with the following solid fat profile:
N20 from 65 to 95;
N35 from 25 to 55;
and further comprising at least 2 wt. %, based on the weight of total fat, of a second hardstock fat with the following solid fat profile:
N20 from 5 to 95;
N30 below 60,
wherein the Quotient-A is from 0.95 to 0.2.

The Stevens value of a W/O emulsion according to the invention is determined as follows: A product, whereof the Stevens-value is to be measured is stabilized at 5 degrees Celsius. The hardness of the product is measured with a Stevens penetrometer (Brookfield LFRA Texture Analyser (LFRA 1500), ex Brookfield Engineering Labs, UK) equipped with a stainless steel probe with a diameter of 6.35 mm and operated in "normal" mode. The probe is pushed into the product at a speed of 2 mm/s, a trigger force of 5 gram from a distance of 10 mm. The force required is read from the digital display and is expressed in grams.

Preferably the emulsion according to the invention has a Stevens-value of from 80 to 500, more preferably from 90 to 400, even more preferably 100 to 300 and still even more preferably of from 120 to 200.

Glossiness

In general, it was found that in emulsions according to the invention, the hardness could be changed while the emulsions maintain a constant and good glossiness. Glossiness is measured by visual inspection of a W/O emulsion and is expressed in a glossiness-value. The glossiness-value can also be derived by measuring both the D3,3 and the e-sigma of an emulsion (i.e. of the dispersed water-phase). For example, a D3,3 value which is larger than 10 results is an emulsion appearing too dull. A very small D3,3 can lead to an emulsion, which is perceived as having too much glossiness. In addition, to have good glossiness the e-sigma of the dispersed water-phase should also be small.

Preferably the emulsion according to the invention has water droplet size distribution with a D3,3 from 8 to 3, more preferably from to 6 to 3.2 and even more preferably from 4.5 to 3.5.

Preferably the emulsion according to the invention has water droplet size distribution with an e-sigma of at most 1.7, more preferably of at most 1.6 more preferably of at most 1.5 and even more preferably of at most 1.4.

Preferably an emulsion according to the invention comprises a first hardstock fat with the following solid fat profile:
N20 from 65 to 95;
N35 from 25 to 55;
preferably has the following solid fat profile:
N20 from 70 to 90;
N35 from 30 to 50;
more preferably has the following solid fat profile:
N20 from 75 to 85;
N35 from 35 to 45;
and even more preferably, is an interesterified mixture of 65% dry fractionated palm oil stearin with an Iodine Value of 14 and 35% palm kernel oil; it results in emulsions having an excellent glossy appearance (e.g. a glossiness value of at least 4) and a good firmness.

Preferably an emulsion according to the invention comprises a second hardstock fat with the following solid fat profile:
N20 from 5 to 90;
N30 below 60;
preferably has the following solid fat profile:
N20 from 10 to 80;
N30 below 30;
more preferably has the following solid fat profile:
N20 from 15 to 70;
N30 below 20;
even more preferably has the following solid fat profile:
N20 from 25 to 65;
N30 below 10;
and still even more preferably is palm kernel fat, coconut oil or a combination thereof; it results in emulsions having an excellent glossy appearance (e.g. a glossiness value of at least 4) and a good firmness.

Preferably the first hardstock fat and second hardstock fat are each added in an amount of 2 to 25 wt. % (e.g. 20 wt. % of the first hardstock and 20 wt. % of the second hardstock), more preferably 4 to 20 wt. % and even more preferably 6 to 15 wt. % and still even more preferably 8 to 14 wt. %, based on the weight of total fat.

Quotient-B

An emulsion according to the invention having a particularly desirable combination of hardness and glossiness could be characterized by a particular SAXS pattern. Such a pattern has a certain ratio of the FWHM and the D-value of the first order long spacing of the crystalline fat in an emulsion.

The Quotient-B is defined as:

$$\text{Quotient-}B = \frac{FWHM\text{-}FP}{(D\text{-value} - 39)}$$

As explained in detail in the Examples section, the D-value is a well established property of a fat diffraction line. A D-value of the first order long spacing of a fat is related to the thickness of repeating bilayers of triglycerides in the crystalline phase which is determined by the fatty acid chain lengths of the triglycerides and type of polymorph.

Thus Quotient-B is the FWHM value of an emulsion divided by a specific number, wherein said number is the D-value of the first order long spacing of the crystalline fat of the emulsion from which 39 is subtracted.

In a preferred embodiment, an emulsion according to the invention has a Quotient-B of at least 0.18, more preferably of at least 0.195 and even more preferably of at least 0.21.

Preferably emulsions according to the invention are wrapper or spreads, more preferably are spreads and even more preferably are low-fat spreads.

The invention is now illustrated by the following non limiting examples.

EXAMPLES

Small-Angle X-Ray Scattering (SAXS)

The SAXS measurements are performed at the high-brilliance ID02 beamline of the European Synchrotron Radiation Facility (ESRF) in Grenoble, France. The incident X-ray wavelength is 0.0996 nm for all experiments. The sample to detector distance is 1.50 m, allowing collection of SAXS data in the range $0.06 < q/nm^{-1} < 4.5$, where q ($=4\pi \cdot \sin\theta/\lambda$) is de wave vector (and $\theta$ the scattering angle). The samples are 2.0 mm thick and held in an aluminium cell with mica windows. A four position temperature stage is used to control the temperature at 10 degrees Celsius. The SAXS detector is a FReLoN (Fast-Readout, Low-Noise) Kodak CCD, based on a Kodak KAF-4320 image sensor. The two-dimensional SAXS pattern is azimuthally averaged to obtain the scattered intensity as a function of q.

The Full Width at Half Maximum (FWHM) values of the first order long spacing derived from SAXS measurements were calculated by converting q to 2-Theta using wavelength 0.15418 nm (Cu K-alpha radiation) for comparison with home lab equipment. The raw data is delivered as ascii files (q versus intensity).

For the conversion of q to D-value, the following formula were used (where lambda is 0.15418 nm):

$q = 4*Pi \; Sin(Theta)/lambda$ $D\text{-value} = (n*lambda)/(2*sin(Theta))$ where n is an integer (=1 for our calculations).

Therefore $D\text{-value} = 2*Pi/q$ (nm)

For the calculation of 2-Theta for Cu K-alpha radiation (where lambda is 0.15418 nm):

$$\text{Sin(Theta)} = \text{Lambda}/(2*D\text{-value})$$

$$2\text{-Theta} = 2*\text{ASIN}(\text{Lambda}/(2*D\text{-value}))*180/\text{Pi}$$

180/Pi is the conversion radians to degrees
Therefore $$2\text{-Theta} = 2*\text{ASIN}(\text{Lambda}/(2*D\text{-value}))*180/\text{Pi}$$

The calculations are performed in Excel and the obtained 2-Theta versus Intensity values are copied into notepad to generate a .txt file. This file was converted to .raw file by the software FileExchange version 1.2.26 (Bruker-AXS). Subsequently this raw file was read in the EVA-software version 12 (Bruker-AXS) to calculate the FWHM and the d-value of the sample.

Stevens Value

Stevens values give an indication about the hardness (also called firmness) of a product. The Stevens value is determined according to the following protocol.

Products are stabilized at 5 degrees Celsius. The hardness of the product is measured with a Stevens penetrometer (Brookfield LFRA Texture Analyser (LFRA 1500), ex Brookfield Engineering Labs, UK) equipped with a stainless steel probe with a diameter of 6.35 mm and operated in "normal" mode. The probe is pushed into the product at a speed of 2 mm/s, a trigger force of 5 gram from a distance of 10 mm. The force required is read from the digital display and is expressed in grams.

Solid Fat Content (SFC) Measurements

The solid fat content (SFC) in this description and claims is expressed as N-value, as defined in Fette, Seifen Anstrichmittel 80 180-186 (1978). The stabilization profile applied is heating to a temperature of 80 degrees Celsius, keeping the oil for at least 10 minutes at 60 degrees Celsius or higher, keeping the oil for 1 hour at 0 degrees Celsius and then 30 minutes at the measuring temperature.

Glossiness

The glossiness of an emulsion was assessed by visual inspection. The emulsions were classified from 0 to 5, wherein:

0 indicates no glossiness and/or a glossiness which is too strong.

5 indicates a good glossiness.

Spreadability

Spreadability is determined according to the following protocol.

A flexible palette knife is used to spread a small amount of the spread on to fat free paper. The spreading screen is evaluated according to standardized scaling. A score of 1 represents a homogeneous and smooth product without any defects, a 2 refers to the same product but then with small remarks as slightly inhomogeneous or some vacuoles, a 3 refers to the level where defects become almost unacceptable, like loose moisture or coarseness during spreading. A score of 4 or 5 refers to unacceptable products, where the 4 refers to a product still having some spreading properties, but an unacceptable level of defects.

Water Droplet Size Distribution of Spreads (D3,3 Measurement)

The normal terminology for Nuclear Magnetic Resonance (NMR) is used throughout this method. On the basis of this method the parameters D3,3 and exp($\sigma$) of a lognormal water droplet size distribution can be determined. The D3,3 is the volume weighted mean droplet diameter and $\sigma$ (e-sigma) is the standard deviation of the logarithm of the droplet diameter.

The NMR signal (echo height) of the protons of the water in a water-in-oil emulsion are measured using a sequence of 4 radio frequency pulses in the presence (echo height E) and absence (echo height E*) of two magnetic field gradient pulses as a function of the gradient power. The oil protons are suppressed in the first part of the sequence by a relaxation filter.

The ratio (R=E/E*) reflects the extent of restriction of the translational mobility of the water molecules in the water droplets and thereby is a measure of the water droplet size. By a mathematical procedure—which uses the log-normal droplet size distribution—the parameters of the water droplet size distribution D3,3 (volume weighed geometric mean diameter) and a (distribution width) are calculated.

A Bruker magnet with a field of 0.47 Tesla (20 MHz proton frequency) with an air gap of 25 mm is used (NMR Spectrometer Bruker Minispec MQ20 Grad, ex Bruker Optik GmbH, DE).

The droplet size of the spread is measured, according to the above described procedure, of a spread stabilized at 5 degrees Celsius right after production for one week. This gives the D3,3 after stabilization at 5 degrees Celsius.

Spreads Product Composition

Edible spreads with a composition as in Table 1 were made according to the methods as described below.

TABLE 1

Spreads product formulation (wt. %).

| Example | C-6/C-1 | 2/C-2 | 3/C-3 | 4/C-4 | 5/C-5 |
|---|---|---|---|---|---|
| FAT-phase: | | | | | |
| inES48 # | 13 | 13 | 13 | 13 | 13 |
| Palm kernel fat## | 0 | 2 | 4 | 6 | 8 |
| Sunflower oil | 86.6 | 84.6 | 82.6 | 80.6 | 78.6 |
| Dimodan RT | 0.3 | 0.3 | 0.3 | 0.3 | 0.3 |
| Vitamins and colorant | 0.1 | 0.1 | 0.1 | 0.1 | 0.1 |
| PRODUCT FORMULATION: | | | | | |
| Fat phase | | | | | |
| Fat-phase | 34 | 34 | 34 | 34 | 34 |
| Water-phase### | Balance | Balance | Balance | Balance | Balance | inES48 is an interesterified mixture of 65% dry fractionated palm oil stearin with an Iodine Value of 14 and 35% palm kernel oil. For examples 2 to 5 and C-6 a fat powder of inES48 was used that was obtained using a supercritical melt micronisation process as described below. For comparative examples C-1 to C-5 the inES48 was used as such (i.e. it was molten during the preparation of the premix). Dimodan RT is a molecularly distilled mono/diacylglyceride mixture derived from fully hardened rapeseed oil (90% monoglyceride) ex Danisco.
fully hydrogenated palm kernel oil
The water-phase comprised 4.5 wt. % of sodium chloride, based on the weight of the water-phase. The pH of the water-phase is adjusted to 4.2 using 20% citric acid solution.

TABLE 2

Solid fat content.

| Solid fat content at: | InES48 | PK | CN |
|---|---|---|---|
| 10 degrees Celsius | 92.0 | 70.6 | 80.0 |
| 20 degrees Celsius | 83.8 | 44.4 | 38.3 |
| 30 degrees Celsius | 57.9 | 0.5 | 0.0 |
| 35 degrees Celsius | 40.8 | 0.0 | 0.0 |
| 40 degrees Celsius | 21.2 | 0.0 | 0.0 |

Preparation of Spreads According to the Invention

Example 2-5

Cold oil and colorant are added to a stirring tank (Fryma vessel) mixed and degassed. A stock solution of the emulsifier also comprising the liquid hardstock was prepared by mixing the emulsifier and the liquid hardstock with about 1% of the oil and heating it up to 75 degrees Celsius. The stock solution, cooled to about 70 degrees Celsius, was added to the degassed oil, with a temperature of about 14 degrees Celsius, and mixed. The temperature of the oil mixed with the stock solution will be about 18 degrees Celsius. Next, fat powder was added to the oil and mixed-in under vacuum. The fat powder and oil mixture is mixed under high shear, using a reflux pipe until an oil-slurry was obtained which appeared smooth and transparent. The maximum temperature increase observed due to mixing was about 21.5 degrees Celsius. Before being fed into the C-unit see below the temperature of the oil-slurry was about 20 degrees Celsius.

The water-phase was prepared by dissolving the sodium chloride in the water and adjusting the pH to about 4.2 using 20 wt. % citric acid solution. Before being fed into the C-unit, see below, the water-phase was cooled to about 12-13 degrees Celsius.

The thus prepared oil-slurry and water-phase were fed to a C-unit (volume 75 ml) operating at a flow-rate of 15 kg per hour and at 2400 rpm. Tubs were filed and stored at 5 degrees Celsius.

Preparation of Spreads not According to the Invention

Comparative 6

Comparative 6 was prepared according to Examples 2 to 5 without addition of liquid hardstock.

Preparation of Spreads not According to the Invention

Comparative 1-5

The water-phase was prepared by dissolving the sodium chloride in the water and adjusting the pH to about 4.2 using 20 wt. % citric acid solution.

Liquid oil, Fat Powder (InES48), and the hardstock (i.e. palm kernel fat) were added slowly to the water phase in the feed tank of the votator at a temperature of degrees Celsius to provide a pre-mix. The fat powder was thus subjected to a temperature at which the fat powder was substantially melted.

To provide a spread, the pre-mix, thermostated at 60 degrees Celsius was pumped at a throughput of 10 kg per hour through three successive A units (i.e. A1, A2 and A3) (set to 1000 rpm) and one C-unit (set to 2000 rpm). The temperatures for A1-A3 were respectively 15, 10 and 5 degrees Celsius, the C-unit was not cooled.

Results

Spreads produced according to the processes and compositions described above were analyzed.

TABLE 3

Spreads analysis

| Sample | D3,3 | e^sigma | Stevens value | Glossiness | Spreading Score |
|---|---|---|---|---|---|
| C-6 | 4.4 | 1.3 | 66 | 5 | 1 |
| 2 | 3.9 | 1.0 | 84 | 5 | 1 |
| 3 | 4.1 | 1.5 | 104 | 5 | 1 |
| 4 | 3.8 | 1.2 | 136 | 5 | 1 |

TABLE 3-continued

Spreads analysis

| Sample | D3,3 | e^sigma | Stevens value | Glossiness | Spreading Score |
|---|---|---|---|---|---|
| 5 | 4.3 | 1.0 | 151 | 5 | 1 |
| C-1 | 16.8 | 5.0 | 41 | 0 | 2-3 |
| C-2 | 10.0 | 3.2 | 77 | 2 | 1 |
| C-3 | 4.7 | 1.8 | 98 | 4 | 1 |
| C-4 | 3.8 | 1.8 | 116 | 5 | 1 |
| C-5 | 3.4 | 1.8 | 135 | 3 | 1 | n.d.: not determined

The results show that for emulsions according to the invention, the glossiness level was constant and excellent (not too low and not too high), which can also be derived from the D3,3 and e^sigma values, while having a varying Stevens value (hardness). This highlights the ability of the process according to the invention to change the hardness level independent from the glossiness, something which could not be achieved by the votator process. Furthermore, since emulsions were made using a single type of fat powder, the process according to the invention is applicable to factory scale settings. Even though a single and simple (i.e. comprising one type of hardstock fat) type of fat powder was used, different emulsion-types (e.g. different spread-types) could be made which varied in hardness level. This highlights that the process is suitable for factory scale implementations yet is flexible.

Other Observations of SAXS Measurements:

TABLE 3

Spreads analysis by SAXS and WAXS

| Sample | D-value (angstrom) | FWHM (2-Theta) | Quotient-A | Quotient-B |
|---|---|---|---|---|
| C-6 | 40.5 | 0.170 | 0.723 | 0.11 |
| 2 | 40.5 | 0.188 | 0.855 | 0.13 |
| 3 | n.d. | n.d. | n.d. | n.d. |
| 4 | 40.1 | 0.252 | 0.887 | 0.23 |
| 5 | n.d. | n.d. | n.d. | n.d. |
| C-1 | 40.6 | 0.235 | ~1* | 0.15 |
| C-2 | 40.4 | 0.220 | ~1* | 0.16 |
| C-3 | n.d. | n.d. | ~1* | n.d. |
| C-4 | 39.9 | 0.284 | ~1* | 0.32 |
| C-5 | n.d. | n.d. | ~1* | n.d. | n.d.: not determined;
*based on theoretical estimated

It was observed that the spreads of Example 2 and 4, and of Comparative C-2, and C-6 had a single diffraction fat-peak. In contrast, in case a spread is made in a fat powder process wherein two types of fat powders are used (i.e. fat powders wherein the hardstock fats have a different composition) two diffraction fat-peaks are typically visible in the SAXS scattering measurements as shown in WO2011/160921.

The invention claimed is:

1. A process for manufacturing an edible water-in-oil emulsion, comprising the steps of:
 a) providing a water-phase;
 b) providing a liquid oil;
 c) providing a fat powder comprising hardstock fat;
 d) providing a hardstock fat in liquid form;
 e) mixing the fat powder comprising hardstock fat, the hardstock fat in liquid form, and the liquid oil to form an oil-slurry, wherein the hardstock fat in liquid form is completely liquid before contact with the fat powder; and f) mixing the oil-slurry formed at step e) with the water-phase to form the water-in-oil emulsion;

wherein the provided fat powder is not subjected after production to a temperature at which a substantial part of the fat powder melts, and the water-in-oil emulsion is fat-continuous and comprises 10 to 85 wt. % of a dispersed water-phase and 15 to 90 wt. % of total fat.

2. The process of claim 1, wherein the fat powder is a fat powder produced by supercritical melt micronisation.

3. The process of claim 1, wherein the hardstock fat in liquid form is provided at step d) by mixing hardstock fat with at least part of the liquid oil at an elevated temperature, wherein said temperature is at least 50 degrees Celsius.

4. The process of claim 1, wherein the temperature of the liquid oil at step e) is from 5 to 25 degrees Celsius.

5. The process of claim 1, wherein the hardstock fat in the fat powder has the following solid fat profile:
N20 from 65 to 95;
N35 from 25 to 55.

6. The process of claim 1, wherein the hardstock fat in liquid form has the following solid fat profile:
N20 from 5 to 90;
N30 below 60.

7. The process of claim 1, wherein the fat powder comprising hardstock fat and the hardstock fat in liquid form are each added in an amount of from 4 to 25 wt. %, based on the weight of total fat.

8. An edible fat-continuous water-in-oil emulsion produced by the process of claim 1, said emulsion comprising 10 to 85 wt. % of a dispersed water-phase and 15 to 90 wt. % of total fat, wherein the hardstock fat comprises at least 2 wt. %, based on the weight of total fat, of a first hardstock fat with the following solid fat profile:
N20 from 65 to 95;
N35 from 25 to 55;
and further comprising at least 2 wt. %, based on the weight of total fat, of a second hardstock fat with the following solid fat profile:
N20 from 5 to 95;
N30 below 60.

9. The edible emulsion of claim 8, wherein the first hardstock fat has the following solid fat profile:
N20 from 65 to 95;
N35 from 25 to 55.

10. The edible emulsion of claim 8, wherein the second hardstock fat has the following solid fat profile:
N20 from 5 to 90;
N30 below 60.

11. The edible emulsion of claim 8, wherein the amount of the first hardstock fat and the amount of the second hardstock fat are each 2 to 25 wt. based on the weight of total fat.

12. The edible emulsion of claim 8, having a Quotient-A of 0.92 to 0.3.

13. The edible emulsion of claim 8, the emulsion including crystalline fat, wherein the emulsion has a Quotient-B of at least 0.18, wherein Quotient-B is the Full Width at Half Maximum (FWHM) value of the emulsion divided by a specific number, wherein said number is the D-value of the first order long spacing of the crystalline fat of the emulsion from which 39 is subtracted.

14. The edible emulsion of claim 8, wherein the emulsion has a Stevens value of from 80 to 500, as measured at 5 degrees Celsius; and a dispersed water-phase with a D3,3 of from 8 to 3 and an e-sigma of at most 1.7.

15. The process of claim 3 wherein the temperature is at least 60 degrees Celsius.

16. The process of claim 3 wherein the temperature is at least 70 degrees Celsius.

17. The process of claim 1, wherein the hardstock fat in liquid form is completely liquid when placed into contact with at least part of the fat powder.

18. The process of claim 1, wherein the hardstock fat in liquid form is completely liquid when placed into contact with all of the fat powder.

* * * * *